United States Patent [19]

Midolo et al.

[11] 3,826,330
[45] July 30, 1974

[54] BRAKE AND STABILIZER FOR AIR CUSHION VEHICLES

[76] Inventors: Lawrence L. Midolo, 1475 Black Oak Dr., Centerville, Ohio 45459; Lee R. Armstrong, 47 Armstrong Rd., Enfield, Conn. 06082

[22] Filed: May 21, 1973

[21] Appl. No.: 362,021

[52] U.S. Cl............. 180/116, 188/264 R, 180/124, 180/128
[51] Int. Cl............................................. B60v 3/08
[58] Field of Search........... 180/124, 128, 116, 117; 188/264 R; 244/110 R, 2, 100 A

[56] References Cited
UNITED STATES PATENTS

| | | | |
|---|---|---|---|
| 3,272,272 | 9/1966 | Hall et al. | 180/122 X |
| 3,275,270 | 9/1966 | Earl et al. | 180/116 X |
| 3,414,077 | 12/1968 | Earl | 180/128 |
| 3,524,517 | 8/1970 | Fleur | 180/119 X |
| 3,595,336 | 7/1971 | Perez | 180/128 |
| 3,677,360 | 7/1972 | Digges | 180/124 |
| 3,727,716 | 4/1973 | Jenkins | 180/128 |

*Primary Examiner*—Kenneth H. Betts
*Attorney, Agent, or Firm*—Harry A. Herbert, Jr.; Arthur R. Parker

[57] ABSTRACT

An air cushion machine-inflatable trunk device compartmentalized into a main, positive pressure, air cushion-chamber producing a supporting lift force on the machine, and an auxiliary, negative or vacuum pressure-chamber further divided into left and right-side, braking and stability control sections, each encompassing a brake lining or friction pad assembled in spaced-apart relation to the bottom of the aft end portion of the trunk device and producing a downward tilting movement to the machine-aft end for thereby bringing the brake linings or friction pads into positive braking contact with the ground surface.

10 Claims, 8 Drawing Figures

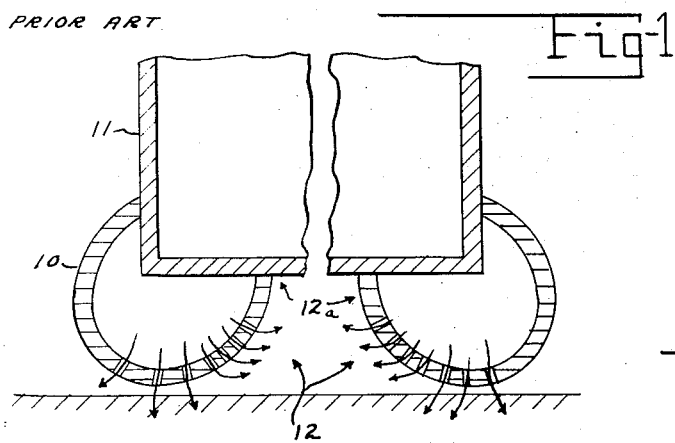
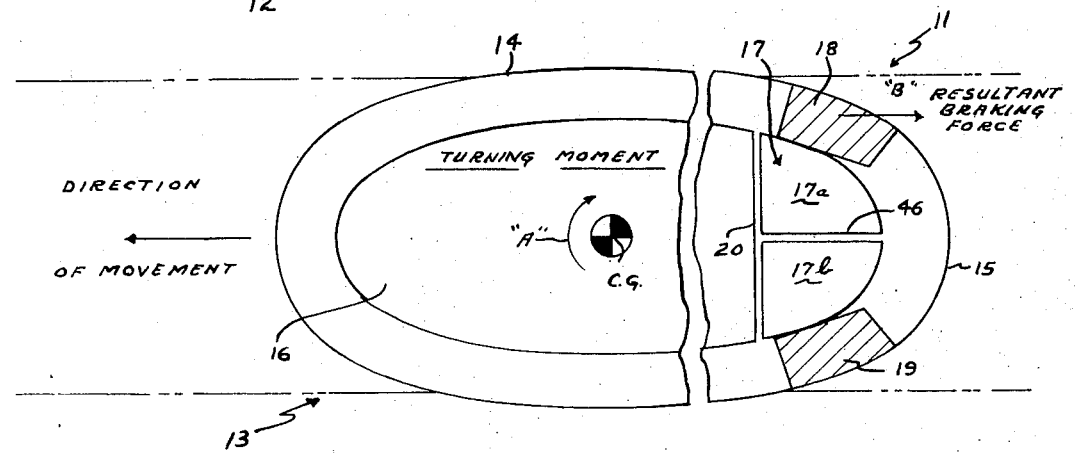
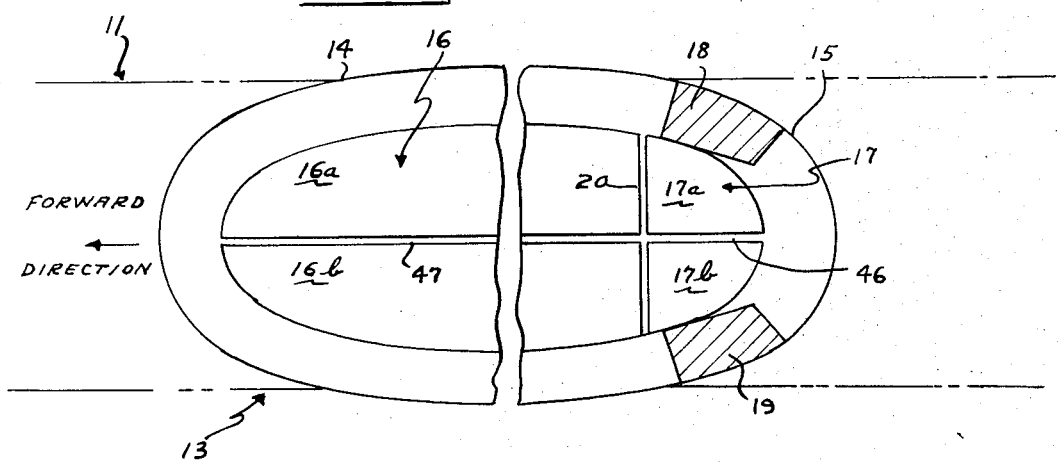

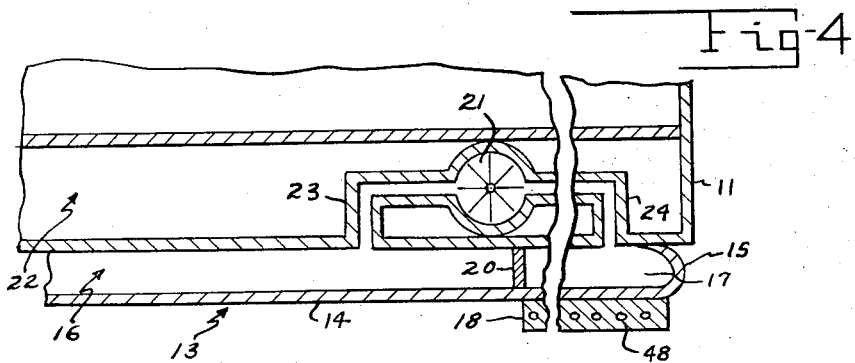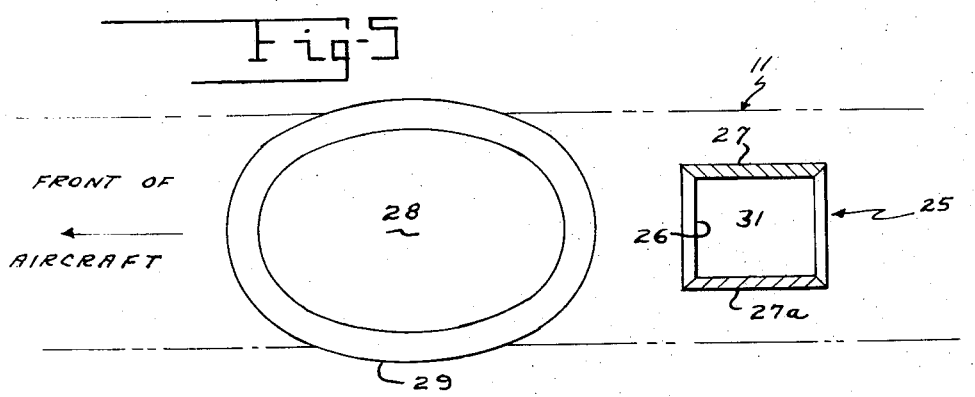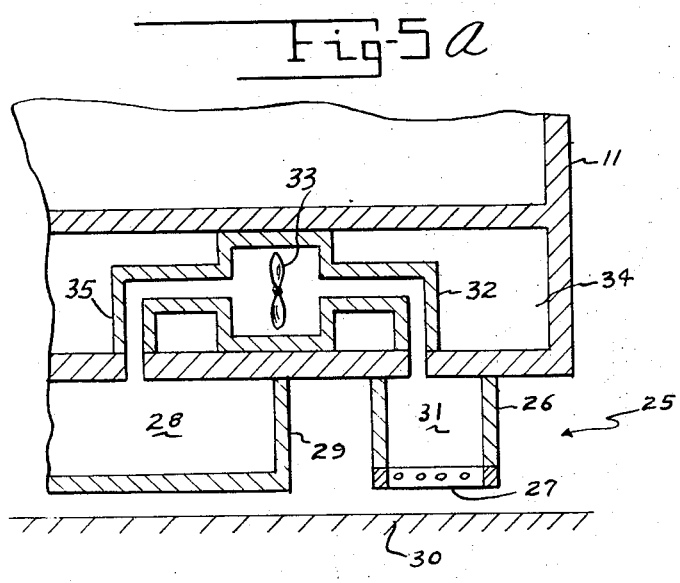

3,826,330

BRAKE AND STABILIZER FOR AIR CUSHION VEHICLES

BACKGROUND OF THE INVENTION

This invention relates generally to the field of air cushion machines of the type mounting an oval or elongated doughnut-shaped device, known as a trunk, on the bottom thereof for providing the ducting for producing an air cushion-type of lifting force on such machines from compressed air admitted thereinto.

Where the foregoing air cushion machine is, for example, an aircraft, the aforementioned trunk replaces the conventional landing gear and the action thereof may be referred to as an air cushion-landing gear. Compressed air, or other suitable gas, delivered to the interior of the trunk, which is inflatable, is directed through numerous perforations, openings, holes, or air passages into an air cushion layer that is disposed between the aircraft and ground surface, and which acts as a sufficient lifting force to overcome the weight of the aircraft and raise it off of the ground. This inflatable trunk replaces the flexible skirt or curtain used in other air cushion machines to define the air cushion layer. One example of such an inflatable trunk-mounted air cushion aircraft is that illustrated in U.S. Pat. No. 3,414,077, issued to T. D. Earl on Dec. 3, 1968. A problem involved with the air cushion machine has been that of decelerating and stopping it within a reasonable distance. Friction pads or pillows have been previously utilized for this purpose, such as is respectively shown, for example, in U.S. Pat. No. 3,595,336, issued on July 27, 1971 to D. J. Perez, and in U.S. Pat. No. 3,677,360, issued on July 18, 1972 to K. H. Digges, the latter patent having been assigned to the U.S. Air Force.

In the above-referred to U.S. Pat. No. 3,595,336, the invention therein is principally concerned with a means for "rigidizing" the trunk 6, 7, at the area thereof which mounts the "skid friction brake means 9" and, in this manner, eliminate or alleviate the previous problem in other developments of excessive wear occurring in the trunk surfaces adjacent to the friction skid pillows thereof due to a considerable yielding of the trunk material and its contact with the ground. In the U.S. Pat. No. 3,677,360 arrangement, the invention concerns the removal of excessive heat in each of a series of inflatable braking pillows, at 14, which are distributed throughout the inflatable trunk 10 thereof. On the other hand, the unique air cushion-trunk of the present invention is considered to constitute a significant improvement over the above-identified patents, as well as other such trunk devices in the prior art, in that it utilizes a novel compartmentalization technique to produce an air cushion trunk that incorporates both a main, air cushion-producing compartment, and a brake-mounted, vacuum pressure-compartment.

In regard to the aforementioned compartmentalization of air cushion trunks, it is noted that, although the general concept thereof is already well-known, as is shown in the aforementioned U.S. Pat. No. 3,414,077 to T. D. Earl, for example, the compartmentalization means of the present invention is unique in that it specifically provides for both main air cushion and brake-mounted vacuum pressure-compartments, as noted hereinbefore, that will produce both relatively large and much more positively controllable braking forces, as well as better stability control in pitch, roll and yaw, than was heretofore possible with previously-developed air cushion-trunks, as will readily appear hereinafter in the following summary and detailed description.

SUMMARY OF THE INVENTION

The present invention consists briefly of an air cushion machine-inflatable trunk that has been uniquely compartmentalized, in its preferred form, into integrally formed, main forward lift-producing-air cushion, and auxiliary, rear vacuum pressure-brake-actuating and stability control compartmented-volumes mounted to the underside of the machine. A pair of brake linings or friction pads may be attached in depending relation from the opposed bottom portions of the trunk portion that comprises the auxiliary rear, vacuum pressure-volume, and fan pump means producing the main flow of compressed air from the atmosphere into the main chamber, may be ducted through its inlet with the said rear vacuum pressure-chamber to thereby automatically and simultaneously form a partial vacuum therein acting on, and thus deflecting or tilting the rear end of the machine downwardly for thereby bringing the brake linings or friction pads into positive and definitely controllable contact with the ground surface. As an appropriate alternative, instead of compartmenting the air cushion trunk itself into two separate volumes, as noted hereinbefore, the vacuum pressure, brake-actuating chamber or volume may be formed either by mounting a separate combined skirt and brake assembly, or a brake mounted-bellows structure to the bottom of the rear or aft end-portion of the air cushion machine. In either event, a detailed description of the various forms of the present invention will be set forth hereinbelow in the following disclosure, taken in connection with the accompanying drawings, in which:

BRIEF DESCRIPTION OF THE DRAWINGS

FIG. 1 is a schematic, broken-away and forward end-portion, cross-sectional view of one type of conventional air cushion-trunk to which the improvement of the present invention may be easily applied;

FIGS. 2 and 3 are bottom plan views, partly schematic and broken-away and illustrating details of the novel compartmentalized and aft end-portion, brake lining-mounted, air cushion trunk combination of the invention;

FIG. 4 depicts a longitudinal sectional view, partly schematic and broken-away, showing further details of the novel compartmentalized air cushion trunk of FIGS. 2 and 3;

FIGS. 5 and 5a respectively represent additional schematic and/or partly broken-away, bottom plan and longitudinal sectional views of a modified form of the invention in which the rear, vacuum pressure, brake lining-mounted chamber or compartment is formed from a separate, combined skirt and brake assembly;

DESCRIPTION OF THE PREFERRED EMBODIMENT

Figure 6:
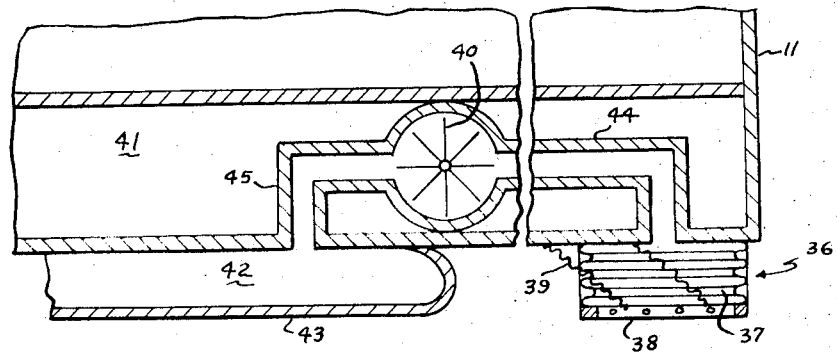
FIG. 6 illustrates another longitudinal sectional view, partly broken-away and schematic, of a further modified form of the invention in which the skirt and brake assembly of FIGS. 5 and 5a are shown replaced by a reinforced bellows structure.

Referring generally to the drawings and, in particular, to FIG. 1 thereof, a standard type of air cushion machine-trunk to which the present invention may be easily applied is indicated generally at 10 as being suspended in depending relation substantially adjacent to the bottom of, a supporting structure, indicated in schematic and broken-away form at 11 and which may comprise a suitable portion of an appropriate air cushion machine or the fuselage of an aircraft. For purposes of simplification only, the description to follow hereinafter will generally be in specific connection with an aircraft. However, it is to be understood that the invention is equally applicable to other types of air cushion machines or ground effect vehicles. To provide for the production of the necessary air cushion of an amount sufficient to lift the air cushion machine, such as an aircraft, a plurality of perforations, holes or air passages or openings, as indicated generally by the arrows, at 12, are incorporated in suitable portions of the sides and bottoms of the wall surfaces of the trunk 10 with, of course, the larger number of such openings being oriented and disposed through the inward facing wall surfaces thereof to thereby produce a greater flow of compressed air thereat and thus form the larger portion of the air cushion-layer directly underneath the bottom of the aircraft fuselage 11 where the greater lifting force is needed. The arrows at 12a schematically indicate this area of greater compressed air flow.

The unique technique of the present invention involves modifying a standard type of air cushion-trunk, as at 10 in the aforementioned FIG. 1, to thereby provide a unique, positive, and controllable braking force and improved yaw, pitch and roll stability for air cushion machines by a novel technique heretofor not available and which, in one form thereof, comprises uniquely compartmentalizing the conventional air cushion-trunk, into the improved trunk, indicated generally at 13 in FIGS. 2 and 3, by dividing it into two separate air cushion-trunk portions, indicated respectively at 14 and 15. Thus, there is formed a first, relatively large, main and forward end-portion, lift-producing, air cushion-compartment, at 16, and a second, relatively small, auxiliary and rear or aft end-portion, vacuum pressure-controllable brake-actuating and stability control compartment, at 17. It is noted that the aft end-air cushion-trunk portion 15, unlike the forward trunk 14, would not incorporate any air passages, as at 12 in FIG. 1.

A pair of brake linings or friction pads, as at 18 and 19, may, in accordance with the unique teaching of the present invention, be mounted on an appropriate portion, as shown, of the bottom of the second, auxiliary aft end and vacuum pressure-chamber or volume-trunk portion 15 and respectively disposed on the right and left sides of the compartment 17. With the above-described unique compartmentalization of the present invention forming a main, air cushion-volume, in novel combination with the aforementioned, vacuum pressure-volume-activated, right and left-side brake linings or friction pads 18, 19 mounted on the appropriate bottom portions of the air cushion-trunk portion 15, a positive, quickly applied and easily controlled braking force may be developed against the ground surface, as for example, during the landing of an air cushion machine-aircraft so equipped, simply by reducing and maintaining the pressure in the volume comprising aft end-compartment 17 to one that is less than atmospheric pressure, which negative pressure naturally is operative directly against the aft end-bottom of the air cushion machine, such as the aircraft fuselage 11 (FIG. 1). This will allow the ambient atmospheric pressure to exert a considerable and definite downward force, and thereby tilting the aft end of the aircraft, for example, and thus bringing the brake linings or friction pads 18 and 19 mounted on the bottom of the aft end-air cushion-trunk portion 15 (FIGS. 2 and 3) into positive gripping and braking contact with the ground surface. The braking force so exerted would be directly proportional to the chamber pressure, for a given braking surface-area. The transversely-extending, separator wall surface, at 20 (FIGS. 2 and 3) provides the principal division or compartmentalization of the air cushion-trunk 13 into the previously-referred to forward and aft or rear trunk portions 14 and 15. It may be made of an inflatable material similar to the air cushion trunk 13 and be disposed in open communication therewith, so that it will automatically inflate with the trunk 13 and thus provide for the requisite separation between the air cushion and vacuum pressure volumes encompassed within the compartments 16 and 17.

Although a separate exhaust fan could be used to induce the lower than ambient (atmospheric) pressure in the aft end-compartment 17, in a more simple arrangement, shown in the FIG. 4 for example, the same fan, as at 21, shown, for example, mounted in a below floor level-compartment 22 of the aircraft fuselage 11, which provides the main, normal compressed, air cushion pressure through the duct 23 into the interior of the foward-end-portion-compartment 16, may also produce the vacuum pressure in the aft end-portion-compartment 17 through the duct at 24 that communicates with the fan inlet.

The structure of the rear or aft end, auxiliary compartment-forming-air cushion-trunk portion 15 may, as an alternative, be comprised of a combined skirt and brake structure, which, as is indicated generally at 25 in the modified form of the invention seen in FIG. 5, may be mounted to the bottom of the aircraft fuselage 11 in spaced relation to, and thus form a separate aft end-compartment from the main air cushion-producing compartment 28 formed by the inflatable trunk at 29. The combined skirt and brake structure 25 consists of a flexible skirt element 26 that may be composed of a suitable plastic or overlapping metal plate material that will act as cushion in any contact thereof with the ground surface at 30, and a brake lining or friction pad element, at 27 and 27a on the bottom of the opposite right and left sides thereof. Again, as in the inventive form of FIGS. 2 and 3, the skirt 26 forms an aft end-negative or vacuum pressure-compartment or volume 31 that may, in one arrangement thereof seen in FIG. 5a, communicate with a duct 32 communicating with the inlet to the fan 33 that may be assembled within a bottom compartment 34 of the aircraft fuselage 11 and communicate with the interior of, and pump compressed air or other suitable gas into, the said main, air cushion-producing compartment 28 through an exhaust duct at 35. Again, the inflatable trunk 29 contains the requisite plurality of air passages or openings (not shown) for transferring the compressed air or other gas therethrough and thus form the required air cushion-lift-supporting layer, on operation of the fan 33. Simultaneously therewith, the operation of the said fan 33 is automatically operative to reduce the pressure below atmospheric within the separate aft end-compartment 31 and thus cause the outside atmospheric pressure to force the aft or rear end of the aircraft downwardly to bring the brake linings or friction pads, as at 27 and 27a, into positive braking contact with the ground surface 30 (FIG. 5a).

As a further alternative to compartmentalizing the conventional air cushion trunk, as at 10 in FIG. 1, by either the use of the aft end-portion, air cushion trunk 15 of the inventive form of FIG. 3 to produce the requisite positive controlled braking, or the combined skirt and brake structure 25 of FIG. 5, the new and improved technique of the present invention further contemplates the use of a separate and simple brake lining-mounted, bellows structure, as is denoted generally at the reference numeral 36 in FIG. 6. The structure 36 comprises a bellows element, at 37, and a pair of brake linings or friction pad elements, as at 38. To ensure that the bellows element 37 is sufficiently strong to maintain its predetermined configuration, while still being able to provide a cushioned transmission of both normal and braking forces, a plurality of spring-acting, linkages, as at 39, may be appropriately interconnected, at a suitable angle forward, between the brake linings or friction pad elements, as at 38, and the bottom of the aircraft fuselage 11. Once again, a single fan 40, mounted in a bottom compartment 41 of the fuselage 11 and in communication between the forward end portion-air cushion-compartment 42 of the air cushion-trunk 43 and the interior and aft end-portion-compartment formed within the bellows element 37, may be used to simultaneously pump compressed air, or other appropriate gas, into the said compartment 42 to form the requisite air cushion, and exhaust from and thus form a negative or vacuum pressure within the bellows element 37, respectively through means of the ducts at 44 and 45.

To further provide for the more definite control and greater stability of an air cushion machine, and in accordance with the still further teachings of the present invention, the turning in a short radius of the vehicle to which the improvement of the present invention may be mounted may be accomplished in a unique and yet uncomplicated manner by further dividing the aft end-compartment 17 of FIG. 2, for example, into two equal compartments or chambers, as at 17a and 17b. This is accomplished by the incorporation of the compartment-separator wall element 46, which wall element 46 may be made of an inflatable material, as in the case of the separator wall element 20, and arranged in communication with the interior of the main air cushion trunk 13 for simultaneous inflation therewith for thereby positively separating the vacuum pressure-chamber or volume 17 into two equal and independent, right and left-side chamber portions at 17a and 17b. Thus, by merely controlling the difference in the negative pressure in each of the aforesaid aft end chambers 17a, 17b, a yaw moment may be applied. For example, a sharp turn to the right, or as is illustrated by the turning moment arrow "A" (FIG. 2), may be easily made, even without any forward movement to the aircraft, by keeping the pressure in the left side, vacuum chamber portion 17b at ambient (atmospheric) pressure, while lowering the pressure in the right-side chamber portion 17a to below ambient (atmospheric) pressure, which action would, of course, positively tilt the aircraft downwardly and to the right side to thereby engage the rightside brake lining or friction pad 18 in a positive gripping and naturally braking contact with the ground surface. The result thereof would be the resultant braking force, indicated by the arrow "B." In this regard, either a separate fan could be used to control the reduced pressure in each of the compartment/chambers 17a, 17b, or the same fan, as at 21 (FIG. 4), for example, could be used that provides the compressed air for the air cushion-producing-compartment, as at 16. Of course, the details thereof are not herein further shown, since the specific nature thereof is unimportant to the present invention and any one of a number of conventional fan and ducting arrangements could be equally used for this purpose.

Thus, by properly modulating or controlling the respective pressure zones created by dividing the aft end-compartment 17 into the two separate compartments 17a and 17b, the air cushioned-aircraft may be turned with little or no forward speed being initially imparted thereto. Moreover, both a zero velocity and a level aircraft can be rather easily maintained on a ground surface sloping from front to rear, for example, to thereby facilitate its loading and unloading. In addition, the cushion zone developed in the air cushion-producing, trunk portion, indicated generally at 16 (FIG. 3), for example, may be likewise further divided by the longitudinally-disposed separator wall surface element at 47 to form the additional air cushion zone-compartments at 16a and 16b, as desired, in order to provide a particular operational control capability and maneuverability to a given aircraft. Thus, for example, because of variations in terrain features, in a particular landing or takeoff area, it might be necessary to elevate one side or the other of the air cushion-machine to clear obstacles, for example, or to take care of extremes in the ground surface. With the utilization of the aforementioned cushion zones produced in the compartments 16a and 16b, and the varying of the respective pressures therein, the foregoing problem of terrain obstacles and certain differences in ground level could, within a given range of movement, be negated. In this regard, therefore, the achievement of improved pitch stability is accomplished merely by generally regulating the pressure difference between the normal air cushion pressure being collectively produced in the forward end-trunk compartments 16a, 16b and that of the vacuum pressure being collectively induced in the aft end-compartments 17a and 17b. Roll stability is also rather easily facilitated by regulating the difference in the air cushion pressure within the forward, separate air cushion-zones, 16a and 16b, and, finally, yaw stability is quickly obtained by controlling the difference in the pressures being induced in the rear, vacuum pressure-compartments 17a and 17b.

Figure 7:
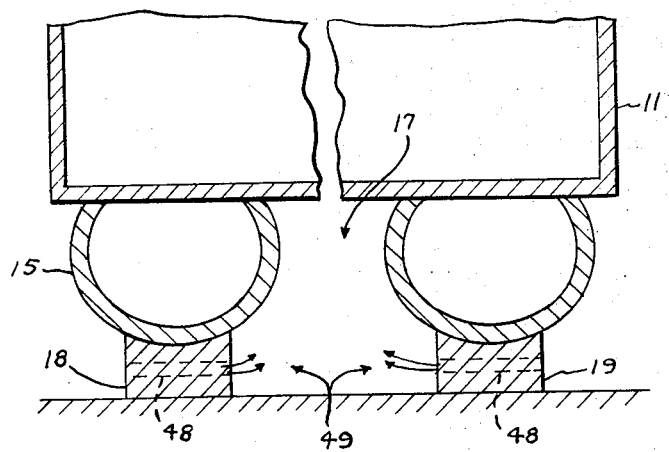
FIG. 7 is a rear or aft end-portion cross-sectional view, partly broken-away and schematic, and illustrating details of an improved vent means for cooling the brake linings or friction pads of the invention.

The previously-described brake linings or friction pads of the invention, as at 18 and 19, each incorporate a series of cooling vents, as at 48 in FIG. 4, for example. As is seen more particularly in FIG. 7, these cooling vents 48 extend through the wall of each brake lining or friction pad and communicate from the outer, ambient (atmospheric) pressure side thereof inwardly to the inner, vacuum pressure-chamber or compartment 17. With the unique arrangement of the present invention, the cooling of each of the inventive brake linings or friction pads, as at 18 and 19, is particularly and uniquely promoted by the fact that, with the new and improved compartmentalization taught by the instant invention, the lowered pressure formed in the aforesaid vacuum pressure-compartment, as at 17 (FIG. 3, for example), specifically provides a significant pressure drop across each of the said brake linings or friction pads 18, 19 to thereby positively induce convective heat transfer by the flow of outside ambient (atmospheric) temperature air inwardly through the said cooling vent holes, as at 48, into the said auxiliary, aft end, vacuum pressure-compartment 17, which flow is schematically indicated by the arrows at 49 in the aforementioned FIG. 7. In this connection, it is to be noted that the size of the vent holes, as at 48, may be easily designed to allow the necessary flow of cooling air therethrough, while still maintaining a negative pressure in the brake-actuating and stability control-compartment 17 sufficient to produce an effective braking force.

Thus, a new and improved inflatable-trunk device for supporting an air cushion machine has been developed whereby the said trunk device is divided into separate, forward, and rear, positive and negative pressure-producing compartments for respectively providing the requisite air cushion-lift to the machine and a downward braking force on the aft end thereof by the simultaneous pumping of compressed air into the forward compartment, and the formation of a negative pressure in the rear compartment to bring brake linings formed on the bottom circumferences of the rear compartment in contact with the ground.

The aforementioned unique compartmentalization of the inventive air cushion trunk further ensures increased stability in pitch and yaw, for example, by respectively regulating the pressure difference between the forward and rear compartments, and by regulating the pressure difference in the rear, vacuum pressure-compartments. Improved roll stability is developed by the present invention by further dividing the main, forward air cushion-compartment into left and right-sections and then controlling the pressure difference therebetween. Also, the inventive compartmentalization of the rear, vacuum pressure-volume into two separate chambers ensures the inherent capability of the air cushion machine in which installed to turn in a very short radius heretofore not feasible with other techniques. Finally, improved cooling of the brake linings or friction pads is similarly effected by incorporating a series of vent holes therein extending from the outside periphery thereof inwardly to communicate with the rear, vacuum pressure-compartment. Because of the low pressure, resulting from novel compartmentalization of the present invention, in the aforementioned vacuum pressure-compartment, there is a builtin pressure drop across each of the said brake linings that automatically acts to positively induce the flow of ambient temperature air from the opposite outside circumferential portion inwardly through the vent holes into the rear compartment.

We claim:

1. In an air cushion machine; a flexible support mounted in suspending relation to, and adapted to elevate said machine a predetermined distance above the landing, take-off or other reaction surface; said flexible support comprising; first, positive pressure, air cushion-producing compartment means extending substantially under the bottom of, and providing the requisite lifting force to the machine; second, separate vacuum pressure-producing compartment means disposed along the aft end-portion of the bottom of, and operable to produce a negative pressure to thereby provide for the downward tilting movement of the aft end portion of the machine under the action of the ambient pressure; and brake lining or friction pad means mounted in opposite relation on the bottom circumference of the second, vacuum pressure-producing compartment for the automatic and positively controllable braking contact with the machine-landing, take-off, or other reaction surface during the said downward tilting movement of the machine-aft end portion; the degree of vacuum pressure being formed in said last-named compartment, relative to the pressure of the compressed air being pumped into said main, air cushion-compartment automatically and positively governing the pitch attitude of the machine.

2. In an air cushion machine as in claim 1, wherein said first, air cushion-producing compartment means comprises an inflatable trunk.

3. In an air cushion machine as in claim 1, wherein said first, air cushion-producing compartment means comprises an inflatable trunk perforated to provide a plurality of air passages for subsequently transferring and directing compressed air, delivered to and initially inflating said trunk, into the requisite lift-producing air cushion layer disposed beneath the machine and trunk.

4. In an air cushion machine as in claim 1, wherein said second, vacuum pressure-producing compartment means comprises an inflatable and non-perforated, air cushion trunk.

5. In an air cushion machine as in claim 1, wherein said second, vacuum pressure-producing compartment means comprises a combined skirt and brake assembly.

6. In an air cushion machine as in claim 1, wherein said second, vacuum pressure-producing compartment means comprises a brake lining or friction pad-mounted, bellows assembly.

7. In an air cushion machine as in claim 6, wherein said bellows assembly incorporates reinforcing means for maintaining a predetermined shape and enclosing a volume with a slight vacuum pressure against both normal and braking loads.

8. In an air cushion machine as in claim 7, said reinforcing means comprises spring-acting linkages interconnected with the bottom of the machine and resiliently acting against deformation and therefore as a cushioning means against the said normal and braking loads.

9. In an air cushion machine as in claim 1, wherein said second, separate vacuum pressure-producing compartment means comprises a left and right side compartment-section respectively mounting a separate brake lining or friction pad on the bottom surface thereof and adapted to be independently regulatable by separately controlling the vacuum pressure therein and thus improving the yaw and roll stability, and turning capability of the machine.

10. In an air cushion machine as in claim 1, wherein said first, air cushion-producing compartment means comprises separate, left and right-side, cushion pressure compartment-sections adapted to be independently adjustable in the positive pressure formed therein for thereby ensuring a level attitude for the machine on sloping terrain and further improving the roll stability thereof.

* * * * *